United States Patent [19]

Peisert

[11] Patent Number: 5,298,046
[45] Date of Patent: Mar. 29, 1994

[54] DIESEL PARTICULATE FILTER ELEMENT AND FILTER

[75] Inventor: Joseph C. Peisert, St. Paul, Minn.

[73] Assignee: Minnesota Mining and Manufacturing Company, St. Paul, Minn.

[21] Appl. No.: 1,299

[22] Filed: Jan. 6, 1993

[51] Int. Cl.⁵ .................... B01D 27/06; B01D 53/36
[52] U.S. Cl. ....................... 55/486; 55/498; 55/520; 55/528; 55/DIG. 30
[58] Field of Search .............. 55/301, 332, 333, 484, 55/486, 498, 520, 528, DIG. 10, DIG. 30

[56] References Cited

U.S. PATENT DOCUMENTS

| | | | |
|---|---|---|---|
| 2,322,548 | 6/1943 | Sigmund | 55/484 |
| 2,397,759 | 4/1946 | Sigmund | 55/484 |
| 3,020,977 | 2/1962 | Huppke et al. | 55/520 |
| 3,076,554 | 2/1963 | Bub | 55/520 X |
| 3,112,184 | 11/1963 | Hollenbach | 55/520 X |
| 3,521,429 | 7/1970 | Leffler | 55/520 X |
| 3,800,515 | 4/1974 | Asker et al. | 55/498 X |
| 4,149,862 | 4/1979 | Sewell, Sr. | 55/498 X |
| 4,205,971 | 6/1980 | Abthoff et al. | 55/330 |
| 4,264,346 | 4/1981 | Mann | 55/523 |
| 4,276,071 | 6/1981 | Outland | 55/523 |
| 4,324,572 | 4/1982 | Erdmannsdorfer et al. | 55/385 |
| 4,343,149 | 8/1982 | Abthoff et al. | 60/311 |
| 4,348,362 | 9/1982 | Foss | 55/301 X |
| 4,455,823 | 6/1984 | Bly et al. | 60/311 |
| 4,543,113 | 9/1985 | Forester et al. | 55/378 |
| 4,576,799 | 3/1986 | Wörmer et al. | 422/176 |
| 4,589,983 | 5/1986 | Wydevan | 55/498 X |
| 4,613,350 | 9/1986 | Forester et al. | 65/2 |
| 4,813,231 | 3/1989 | Bykowski | 60/274 |
| 4,839,037 | 6/1989 | Bertelsen et al. | 55/520 X |
| 4,923,487 | 5/1990 | Bogart et al. | 55/498 X |
| 4,938,786 | 7/1990 | Tonomoto | 55/528 X |
| 4,940,476 | 7/1990 | Buck | 55/520 X |
| 5,008,086 | 4/1991 | Merry | 422/180 |
| 5,055,275 | 10/1991 | Kanniainen et al. | 55/DIG. 30 |
| 5,141,641 | 8/1992 | Burgess | 210/483 |
| 5,171,341 | 12/1992 | Merry | 55/484 |
| 5,174,968 | 12/1992 | Whittenberger | 422/174 |
| 5,174,969 | 12/1992 | Fischer et al. | 422/180 |
| 5,190,571 | 3/1993 | Fay et al. | 55/523 |
| 5,229,078 | 7/1993 | Haerle | 422/171 |

FOREIGN PATENT DOCUMENTS

| | | |
|---|---|---|
| 0275372A1 | 10/1987 | European Pat. Off. |
| 2501241 | 7/1975 | Fed. Rep. of Germany ........ 55/498 |
| 3545762A1 | 7/1987 | Fed. Rep. of Germany . |
| 3731766A1 | 3/1989 | Fed. Rep. of Germany . |
| 3800723A1 | 7/1989 | Fed. Rep. of Germany . |
| 3801634A1 | 8/1989 | Fed. Rep. of Germany . |
| 3806131C2 | 8/1989 | Fed. Rep. of Germany . |
| 3910554A1 | 10/1989 | Fed. Rep. of Germany . |
| 61-192319 | 8/1986 | Japan ........................... 55/498 |
| 281857 | 12/1927 | United Kingdom ............... 55/520 |
| 2193656 | 2/1988 | United Kingdom . |

OTHER PUBLICATIONS

Japanese Abstract No. 57-163112, published Oct. 7, 1982.

Primary Examiner—Robert Spitzer
Attorney, Agent, or Firm—Gary L. Griswold; Walter N. Kirn; Gregory D. Allen

[57] ABSTRACT

An efficient, economical, compact diesel particulate filter element in the form of a spiral roll. The filtering element is useful as a filtering element in a diesel particulate filter.

20 Claims, 3 Drawing Sheets

DIESEL PARTICULATE FILTER ELEMENT AND FILTER

BACKGROUND OF THE INVENTION

1. Field of the Invention

This invention relates to a diesel particulate filter element that removes particulates from the exhaust of diesel engines.

2. Description of the Related Art

Diesel engines emit a hazardous, sooty exhaust that can be rendered less hazardous by using diesel particulate filters. Conventional diesel particulate filters, however, tend to unduly increase fuel consumption and to have poor durability.

Conventional diesel particulate filters can be divided into four categories or types, the first type being characterized by having a ceramic wallflow monolith, the second type by having a rigid ceramic foam, the third type by having a mass of fibrous filter material, and the fourth type by having one or more hollow, perforated, metal tubes. Each filter type can have an elongated tubular casing adapted for connection to an exhaust system. Further, each filter type can be periodically regenerated during use by burning off the collected particulate matter.

SUMMARY OF THE INVENTION

The present invention provides a spirally wound filtering element for a diesel particulate filter, the filter element comprising:

(i) a plurality (preferably two) of layers of filter material (preferably, nonwoven mat(s)) comprising inorganic fibers, each layer extending substantially the full axial dimension of the spirally wound roll;

(ii) a plurality (preferably two) of layers of open mesh material each having widths less than the widths of the layers of filter material and are alternately interposed between successive layers of the filter material, the alternate layers of open mesh material positioned between (preferably coterminous in the axial direction) opposite sides of the spirally wound roll to provide spiral inlet and outlet exhaust channels opening into the spirally wound roll from alternate sides of the roll, each layer of filter material extending beyond the layers of open mesh material to close each of the radially inner and outer ends of the spiral channels; and (iii) a resilient stuffer strip extending between one side of the roll and an interior edge of each of the layers of open mesh material, such that each spiral channel is blocked so that exhaust entering the exhaust inlet channel passes radially through the layers of filter material before exiting through the exhaust outlet channel.

By extending beyond the radially inner and outer ends of the spiral channels, the filter material prevents exhaust gas from flowing between the spiral channels without being filtered. To further guard against this, the outermost convolution of filter material preferably extends at least a full turn beyond the end of the outermost spiral channel. Preferably, the resilient stuffer strip is about equal in width to the difference between the axial direction of the layer of open mesh material and the layer of filter material.

The inventive diesel particulate filter element can employ a plurality of filter material layers and a plurality of open mesh material layers to provide more than one pair of inlet and outlet spiral channels.

In this application:

"inorganic fiber" refers to any inorganic-based fiber which is resistant to high temperature (e.g., temperatures above about 600° C.) and is chemically resistant to diesel exhaust gas;

"yarn" means a plurality or bundle of individual fibers or filaments;

"axial dimension" as used herein refers to the axial dimension of spirally wound material;

"radial dimension" as used herein refers to the radial dimension of spirally wound material;

"width" as used herein is measured in the axial dimension of spirally wound material;

"resilient" refers to the capability of a material to recover its size and shape after deformation caused by compression stress;

"heat-fugitive fiber" refers to a fiber comprising constituents which decompose and volatilize when heated (e.g., organic material); and "fiber segment" refers to the portion of a broken fiber protruding from the core of the yarn.

In another aspect, the present invention provides a diesel particulate filter comprising:

(a) a tubular casing having two ends;

(b) means for connecting said ends of the casing to an exhaust system; and (c) a spirally wound filtering element according to the present invention, the spirally wound filtering element substantially filling the casing radially.

To minimize resistance to exhaust flow, the open mesh material should be as open as possible. Excessive openness, however, causes undesirable compression (or closure) of the spiral channels. Preferably, the open mesh material has an openness of at least 60% by volume. More preferably, the openness of the open mesh material is at least 80% by volume.

The diesel particulate filter according to the present invention provides an efficient, economical, compact system for removing particulate from diesel exhaust. Further, a common problem associated with a fourth-type of diesel particulate filter that employs short or staple fibrous filter material is that it tends to experience fiber shedding resulting in an undesirably short life. Embodiments of the diesel particulate filter according to the present invention provide a solution to this problem.

BRIEF DESCRIPTION OF THE DRAWING

The invention may be more easily understood in reference to the drawing, all figures of which are schematic. In the drawing.

DESCRIPTION OF THE PREFERRED EMBODIMENTS

Figure 1:
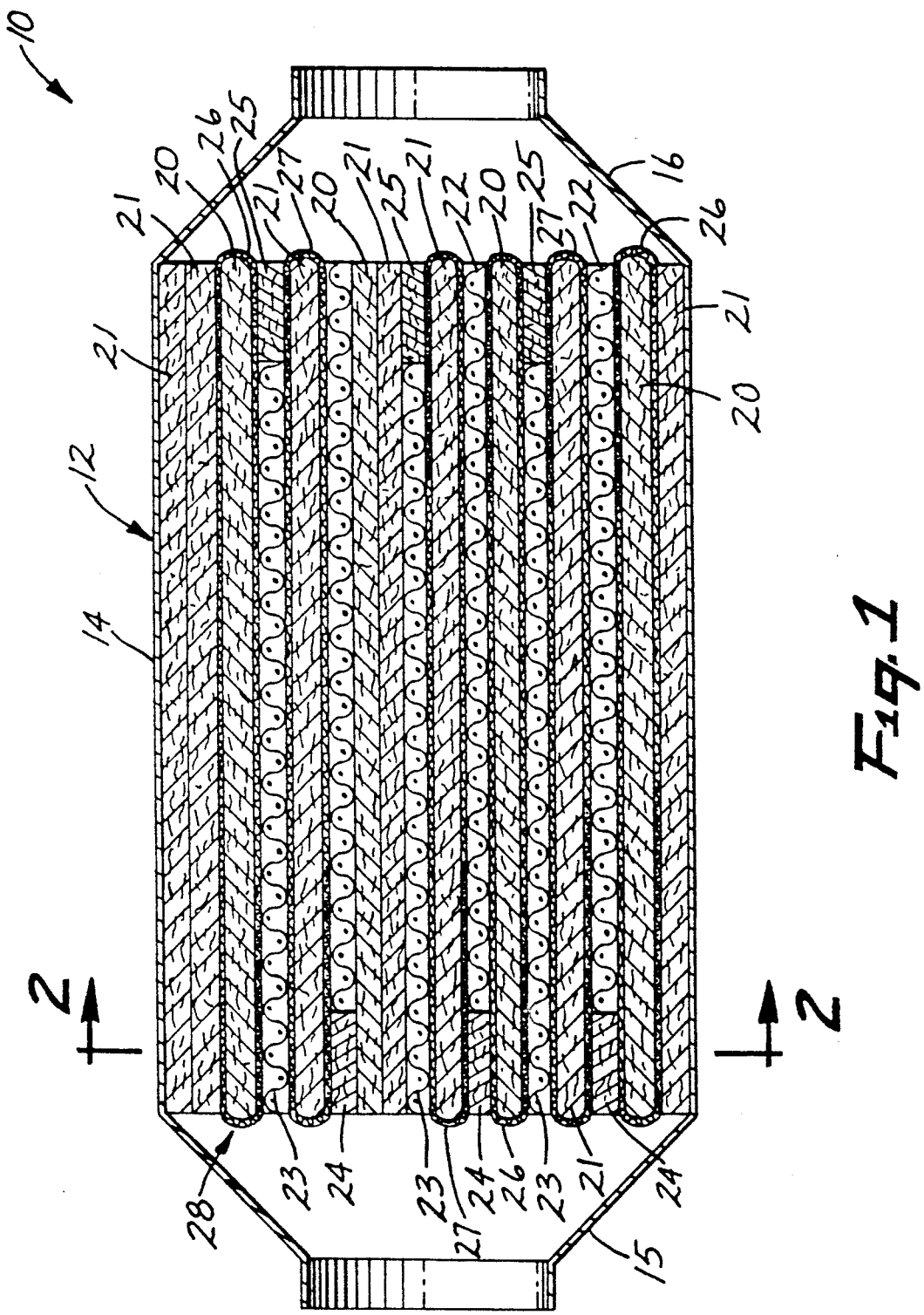
FIG. 1 is a longitudinal central section through a diesel particulate filter of the invention.
Figure 2:
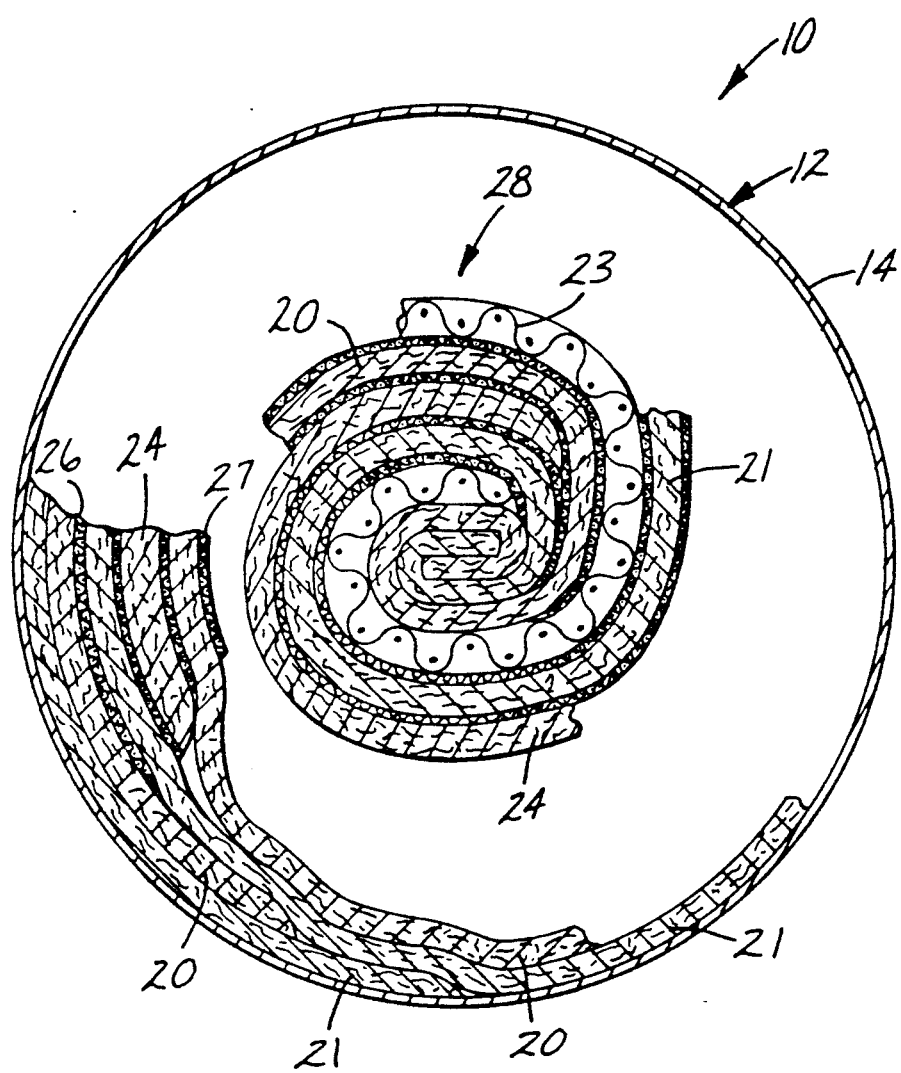
FIG. 2 is a cross section along line 2—2 of FIG. 1.
Figure 3:
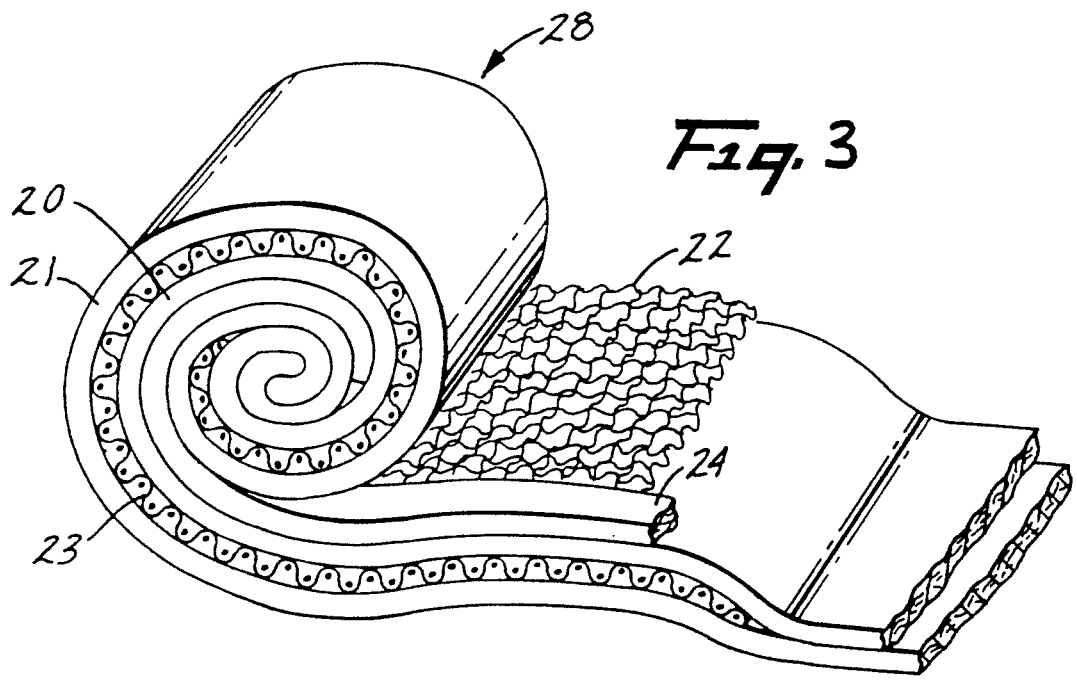
FIG. 3 is a simplified perspective view of materials being wound up into a roll to provide the filtering element of the diesel particulate filter shown in FIG. 1.

Referring to FIGS. 1 and 2, the diesel particulate filter 10 has casing 12 including cylindrical body 14, conical exhaust inlet 15, conical exhaust outlet 16, and filtering element 28. Filling cylindrical body 14 is a filtering element 28 comprising materials that have been spirally wound up into a roll as shown in FIG. 3. Those materials include inner and outer layers 20 and 21, respectively, of ceramic filter material, each extending the full axial width of the roll, and outlet and inlet layers 22 and 23, respectively, of corrugated open metal mesh that are narrower than layers of filter material 20 and 21 in the axial direction of the roll. Extending laterally between one side of the roll and the interior edge of each of layers of open mesh materials 22 and 23 are resilient stuffer strips 24 and 25, respectively. Surrounding each of filter layers 20 and 21 are screens 26 and 27, respectively, in the form of a sleeve.

The outermost convolution of the outer layer of filter material extends more than a full convolution beyond the end of the spiral channel formed by inlet layer 23 of open mesh material, and the outermost convolution of the outlet layer of filter material extends a short distance beyond the end of the spiral channel formed by inner layer 22 of open mesh material. At the center of the spiral roll, both layers of filter material start before and, therefore, close the radially inner ends of each of the spiral channels. At each end of each spiral channel, the layers of open mesh material and stuffer strip are coterminous.

Figure 4:
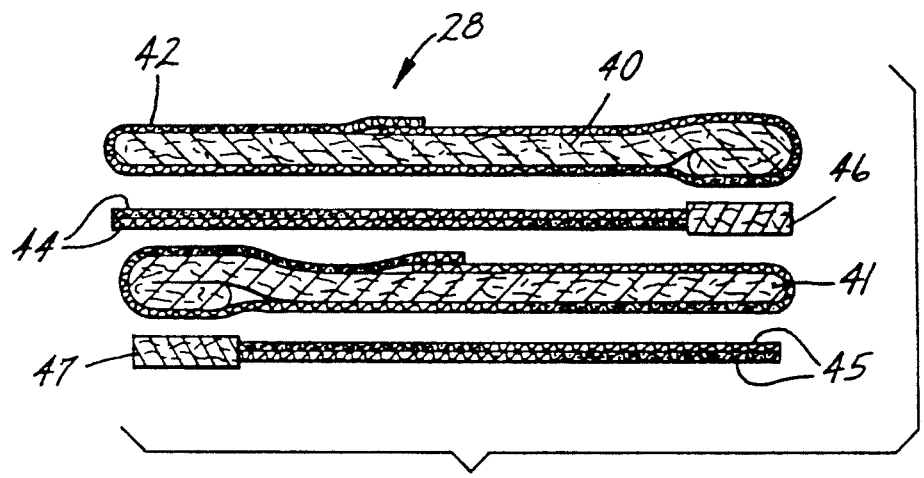
FIG. 4 is an edge view of another set of materials that can be spirally wound to provide a second filtering element according to the invention.

Referring to FIG. 4, filtering element 28 includes inner layer 40 and outer layer 41, each being folded along one edge and overwrapped with woven metal wire sleeve 42. Contiguous with layers 40 and 41 are layers 44 and 45 of open mesh material and resilient stuffer strips 46 and 47. The layers of open mesh material and stuffer strip are coterminous in length. The layers of filter material are of greater length such that they extend beyond the ends of the open mesh and stuffer strip before being spirally wound to form a filtering element. The greater bulk provided by the folds at the ends of filtering layers 40 and 41 aids in preventing passage of unfiltered gas.

The size of the filtering element and, therefore, the casing depends on the particular filter demands and size of the diesel engine. In general, the cost of the filter increases with an increase in its size. On the other hand, too small a filter for a particular application may provide poor filtering of the exhaust gas.

The casing can comprise any suitable material including metals or ceramics. For ease of manufacture, the preferred material is a metal. Preferably, the metal is stainless steel sheet metal. Means for constructing the casing include those known in the art for the particular material of which the casing is comprised. For example, if the casing is metal, such means may include welding.

For economy in construction, the casing preferably is circular or elliptical in cross section, although it could be rectangular. The casing can be elongated to allow it to have a slim profile. If, for example, the inside diameter of the casing is in the range from about 7 to about 20 cm, the open mesh material preferably has a thickness in the range from about 2 to about 10 mm. At substantially smaller thicknesses, the back pressure tends to become undesirably high. Substantially greater thicknesses tend to reduce the soot-holding capacity of the filter, necessitating more frequent regeneration.

The filter media comprises inorganic fibers, preferably, ceramic (e.g., alumina-boria-silica, alumina-silica, alumina, silica, silicon carbide, or boron nitride) fibers. Most preferably, the filter media comprises alumina-boria-silica blown microfibers. The ceramic fibers can be, for example, amorphous, polycrystalline, or a combination thereof.

The inorganic fibers can be converted to a suitable woven or nonwoven form (e.g., a blanket or mat) using conventional techniques. Preferably, the thickness of a woven or nonwoven mat or blanket is in the range from about 1 to about 50 mm. Mats or blankets less than about 1 mm tend to have poor filtering efficiency due to the relatively low soot holding capacity of thin mats or blankets. The use of mats or blankets thicker than about 50 mm tend to provide undesirably high back pressures. More preferably, the thickness of the mat or blanket is in the range from about 1 to about 15 mm, and most preferably about 1 to about 10 mm.

For a filtering element comprising a nonwoven mat comprising inorganic fibers, the mat preferably is selected to allow a high degree of filtering efficiency without significant back pressure. Preferably, the fibers comprising the nonwoven mat have a diameter up to about 6 micrometers. More preferably, the fibers comprising the nonwoven mat have a diameter up to about 3 micrometers, wherein fibers having such a diameter can be referred to as "microfibers." A preferred nonwoven mat comprises ceramic blown microfibers.

Suitable nonwoven mats comprising microfibers are commercially available, and include those marketed under the trademarked designations "ULTRAFIBER 312" and "ULTRAFIBER 440" from the 3M Company of St. Paul, Minn., and "SAFFIL LD MAT" from Imperial Chemicals, Inc., of Cheshire, U.K., and "FIBERFRAX" from the Carborundum Co. of Niagara Falls, N.Y.

Although inorganic fibers having diameters greater than about 6 micrometers typically provide a filter which is less efficient than one comprising fibers having smaller diameters, inorganic fibers having diameters up to about 20 micrometers may also be useful. Such fibers typically are available in the form of yarns. These yarns typically comprise in the range from about 780 to about 7800 individual inorganic fibers. The yarn can be ply-twisted.

Preferably, the yarn comprises inorganic fibers having a diameter in the range from about 7 to about 15 micrometers, more preferably, in the range from about 9 to about 14 micrometers. Fibers having a diameter within the specified ranges generally are easier to make and texturize than fibers having diameters outside of these ranges. Further, fibers substantially below 5 micrometers in diameter tend to be easily damaged (i.e., broken when texturized). Fibers substantially above 20 micrometers in diameter typically provide a filter which is less efficient than one comprising fibers having diameters within the specified ranges.

To aid in handling, the yarns are typically sized using conventional techniques. Alumina-boria-silica yarns are commercially available, for example, under the trademarked designations "NEXTEL 312 CERAMIC YARN" and "NEXTEL 440 CERAMIC YARN" from the 3M Company of St. Paul, Minn.

Texturization of the inorganic yarn improves its filter or trapping efficiency. Preferably, the inorganic yarn is texturized such that it is lofty, e.g., by being texturized so that loops of continuous fibers, individual fiber segments, or a combination thereof, extend outwardly from a dense core. Loops of continuous fibers are most preferred. The inorganic yarn can be texturized by techniques known in the art including, for example, air jet or mechanical texturization. Air jet texturization is preferred because it generally provides a texturized yarn having fewer fiber segments and more fiber loops than does yarn texturized by the mechanical technique.

Preferably, the texturized inorganic yarn has a diameter in the range from about 1 to about 10 mm. More preferably, the diameter of the texturized inorganic yarn is in the range from about 3 to about 6 mm. The filtering or trapping efficiency of texturized yarn having a diameter in the specified ranges is generally superior to such yarns having diameters outside of these ranges.

Alternatively, the inorganic fibers (preferably, microfibers) can be loose (i.e., in staple form). If the filter material is comprised of loose or staple fibers or yarn, it is preferable to hold the filter material together by sandwiching the fibers or yarn between, for example, two heat fugitive scrims. Preferably, the heat fugitive scrims have an adhesive coating on the major surfaces thereof that are in contact with the fibers or yarn. Suitable heat fugitive scrims are commercially available, for example, under the trade designation "#1515 Tape" from the 3M Company (Medical Specialties Division).

The open mesh material can comprise any suitable material including metals and ceramics. Useful open mesh materials include perforated sheets, woven and nonwoven wire networks, and expanded metal sheets. A preferred open mesh material comprises fine knitted wires of stainless steel. Preferably, the wires have a diameter in the range from about 0.1 to 1 mm, more preferably, about 0.2 to about 0.5 mm.

To provide the desired openness, each layer of open mesh material is preferably corrugated or otherwise rewrinkled. Although the corrugations can be oriented in any direction, their ridges preferably extend in the direction of the axis of the spiral roll so that the open mesh material can easily be wound up with the layers of filter material and stuffer strips without buckling.

When each of the spirally wound layers of filter material is made of continuous-filament yarn of inorganic fibers as opposed to staple fibers, there is typically no need for a screen to be interposed between successive convolutions of filter material and open mesh materials.

Suitable screens include the woven wire screens described in U.S. Pat. No. 5,008,086 (Merry), the disclosure of which is incorporated herein by reference. The screens are typically cut on the bias. A knitted wire screen when wrapped around the edges of the filter material tends not to buckle during windup, because the wires are free to side at their crossing points. A knitted wire screen preferably is made as a sleeve into which a layer of the filter material fits. When using such a sleeve, the layer of filter material can be somewhat wider than the axial width of the filtering member and folded (at one or both edges) to that width. Each fold preferably is coterminous with a stuffer strip and can serve to seal voids that may otherwise be created by screens.

Other useful screens include perforated metal sheets, wire networks, expanded metal sheets, and ceramic fabrics. Suitable woven or nonwoven ceramic fabric made of continuous-filament aluminoborosilicate ceramic fibers, which can provide additional filtration, is commercially available under the trademarked designations "NEXTEL 312" and "NEXTEL 440" from the 3M Company. Further, a web of continuous-filament yarn is highly resistant to fiber shedding.

Screens at the interfaces between the open mesh and layers of filter material tend not only to protect against fibrous material being blown into the atmosphere but also to minimize penetration of filter material into the open mesh, thereby minimizing interference with the flow of exhaust. Preferably, individual openings in the screen are up to about 10 mm in breadth, more preferably, up to about 3 mm. Further, the pressure drop in the exhaust at a screen is preferably as low as possible. The screen, preferably, has an open area of at least about 20%, more preferably, at least about 50%. Preferably, the thickness of the screen is in the range from about 1/20 to about ¼ of the thickness of the open mesh material. Screen thicknesses below the 1/20 limit tend to provide a filter having restricted gas flow through it. The volume taken up by screens having thicknesses above the ¼ limit tend to be excessive and take up space which can be filled with filter material.

Each of the spiral stuffer strips can be of the same material as the spiral layers of filter material. If such is the case, the spiral stuffer strips can enhance the efficiency of the novel diesel particulate filter, although most of the exhaust tends to pass radially through the spiral layers of filter material, due to the respective exhaust path lengths. Unless the filter material is folded at one or both edges, the stuffer strips must originally be at least as thick as the open mesh material. Preferably, the stuffer strips are thicker than and compressible to the thickness of the open mesh material. The outer edge of each of the stuffer strips preferably is coterminous with a side of the roll, and each stuffer strip is preferably about 3 to 4 cm wide. At substantially smaller widths, the strips may not adequately block the exhaust. At substantially larger widths, the strips may unduly reduce the effective filtering areas at the spiral channels. Useful stuffer strips, which do not have a filtering function, include intumescent mats such as a vermiculite mat (commercially available, for example, under the trade designation "INTERAM 2600, Series I" from the 3M Company).

Each of the spiral layers of filter material and the stuffer strips comprising filter material can incorporate up to about 25% by volume heat-fugitive fibers, based on the total fibrous mass. Passageways left behind when the fugitive yarn is burned away during or prior to the first use of the filter may provide both reduced back pressure and enhanced access to the filtering fibers.

Suitable heat-fugitive yarn is commercially available and includes, for example, polypropylene yarn (commercially available, for example, under the trademarked designation "HERCULON" from Hercules, Inc., of Magna, Ut.), and rayon yarn (commercially available, for example, from Avtex Fibers of Front Royal, Va.).

For greater assurance against the flow of exhaust between the filtering element and the casing without being filtered, the roll can be wrapped in an intumescent mat that expands when exposed to the heat of the first use of the novel diesel particulate filter or prior to use. Such a mat, which is selected to withstand temperatures encountered in use and during regeneration, provides an easy means to insert the filtering element into the casing and securely holds the filtering element in place against the exhaust forces.

To aid in the oxidation of carbon and soluble organic constituents (e.g., hydrocarbons and carbon monoxide) of diesel exhaust soot particulates, the filter element can further comprise an oxidation catalyst coated onto the inorganic yarn, inorganic nonwoven mat, or a combination thereof. Such oxidation catalysts are known in the art and include, for example, precious metals (e.g., platinum, rhodium, other platinum group metals, and silver) and base metals (e.g., copper, iron, manganese, and potassium). Methods for coating the catalyst onto the inorganic fibers are known in the art.

Optionally, the inventive diesel particulate filter further comprises means for periodic burnoff of accumulated particles, e.g., by periodically heating the exhaust to a temperature above the combustion point of the trapped particulate matter. Useful electrical combustion techniques are taught in European patent application Publ. No. 0 275 372 (Gürtler et al.), laid open Jan. 3, 1990, the disclosure of which is incorporated herein by reference.

The accumulated particles can also be burned away by heating the filter in an oven (e.g., in an air atmosphere at a temperature in the range from about 550° C. to about 900° C. for a time period typically in the range from about 1 to about 2 hours) or by connecting a gas burner to the inlet enclosure.

A preferred means for periodic burnoff of accumulated particles is disclosed in assignee's co-pending application entitled "Electrically Regenerable Diesel Particulate Trap," U.S. Ser. No. 07/680,812, now U.S. Pat. No. 5,258,164 the disclosure of which is incorporated herein by reference.

Objects and advantages of this invention are further illustrated by the following examples, but the particular materials and amounts thereof recited in these examples, as well as other conditions and details, should not be construed to unduly limit this invention. All parts and percentages are by weight unless otherwise indicated.

EXAMPLE 1

A diesel particulate filter such as illustrated in FIGS. 1 and 2 was prepared. The casing was a cylindrical body, which had an inside diameter of 120 mm, formed from a 1.6 mm thick stainless steel sheet. The filtering element employed 15 mm thick blankets of alumina-boria-silica ceramic blown microfibers (commercially available under the trade designation "ULTRAFIBER 312" from the 3M Company, St. Paul, Minn.). The axial dimension of the blankets was 165 mm. The stuffer strips also employed blankets of alumina-boria-silica ceramic blown microfibers ("ULTRAFIBER 312"), except their axial dimension was 35 mm. For the layers of open mesh material, 5 mm thick corrugated open mesh of knitted mesh of 0.28 mm diameter stainless steel mesh wires were used. The open mesh material had 1.9 loop/cm and 1 corrugation/cm. The axial dimension of the open mesh material was 125 mm. The screens were a 0.5 mm thick weave of 0.25 mm diameter stainless steel wires. The axial dimension of the screens, which had 5 openings/cm, was 125 mm.

The diesel particulate fiber was connected to one bank of a dual exhaust system of a 6.2-liter diesel engine incorporated into a truck (1984 Chevrolet Suburban). The truck was driven for about 55 minutes covering a distance of about 90 kilometers at a speed of about 98 km/hr.

The amount of soot collected, which was about 9.8 grams, was determined by weighing the filter before and after the test. The pressure that the filter was subjected to was measured before and after the road test using a conventional flow bench having a blower with adjustable air flow, and having a connection pipe about 4 cm in diameter. The results are shown in Table 1, below.

TABLE 1

| Air flow, $m^3$/hr | $\Delta P$ clean filter, cm $H_2O$ | $\Delta P$ loaded filter, cm $H_2O$ |
|---|---|---|
| 34 | 2.8 | 8.4 |
| 51 | 5.3 | 14.5 |
| 68 | 7.6 | 18.3 |
| 85 | 9.4 | 23.1 |
| 102 | 12.2 | 28.7 |
| 119 | 16.0 | 35.8 |
| 136 | 19.3 | 42.7 |
| 153 | 24.1 | 51.3 |
| 170 | 27.9 | 58.4 |
| 187 | 32.8 | 66.0 |
| 204 | 38.6 | 76.2 |

These results demonstrate that the diesel particulate filter of Example 1 is effective for collecting soot from the exhaust of a diesel engine. Use of the diesel particulate filter did not significantly reduce the driving performance of the vehicle.

EXAMPLE 2

A diesel particulate filter was constructed as described in Example 1. The particle trapping efficiency of the filter was measured using conventional multiple batch filter sampling at the inlet (i.e., upstream) and outlet (i.e., downstream) of the filter, using the filter handling procedures outlined in 40 CFR § 86.1339-88 (1989), the disclosure of which is incorporated herein by reference. The membrane filters used were 47 mm in diameter (commercially available under the trade designation "PALLFLEX TEFLON MEMBRANE FILTERS" from Pallflex Products Corp. of Putnam, Conn.

To calculate the efficiency of the diesel particulate filter, the mass concentration of the downstream sample (i.e., the amount of soot in the downstream membrane filter divided by the volume of the sample) was divided by the mass concentration of the upstream sample (i.e., the amount of soot in the upstream membrane filter divided by the volume of the sample). This quotient was subtracted from unity and the result multiplied by 100.

The particle trapping efficiency of the filter was measured three times. The results, including the initial $\Delta P$ (i.e., the $\Delta P$ at the beginning of the test) and the final $\Delta P$ (i.e., the $\Delta P$ at the end of the test), are shown in Table 2, below.

TABLE 2

| Ex | Initial $\Delta P$, mm $H_2O$ | Final $\Delta P$, mm $H_2O$ | Particle trapping efficiency of filter, % |
|---|---|---|---|
| 1 | 889 | 1168 | 92 |
| 2 | 1270 | 1346 | 89 |
| 3 | 1372 | 1422 | 72 |

The results demonstrate that the diesel particulate filter of Example 2 is effective for collecting soot from the exhaust of a diesel engine. Use of the diesel particulate filter did not significantly reduce the driving performance of the vehicle.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A spirally wound filtering element for a diesel particulate filter, said filter element comprising:

(i) a plurality of layers of filter material comprising inorganic fibers, said plurality of layers being wound to provide a spirally wound roll, each layer extending substantially the full axial dimension of said spirally wound roll;

(ii) a plurality of layers of open mesh material each having widths less than the widths of said layers of filter material and are alternately interposed between successive layers of said filter material, said open mesh material positioned between opposite sides of said spirally wound roll to provide spiral inlet and outlet exhaust channels opening into said spirally wound roll from alternate sides of said roll, each layer of filter material extending beyond said layers of open mesh material to close each of the radially inner and outer ends of said spiral channels; and (iii) a resilient stuffer strip extending between one side of said roll and an interior edge of each of said layers of open mesh material, such that each spiral channel is blocked so that exhaust entering said exhaust inlet channel passes radially through said layers of filter material before exiting through said exhaust outlet channel.

2. A spirally wound filtering element as defined in claim 1 comprising two layers of said inorganic filter material, each of which is approximately equal thickness, and two layers of said open mesh material, wherein said open mesh material is corrugated.

3. A diesel particulate filter comprising
(a) a tubular casing having two ends;
(b) means for connecting said ends of said casing to an exhaust system; and
(c) a spirally wound filtering element as defined in claim 1, said spirally wound filtering element substantially filling said casing radially.

4. A diesel particulate filter as defined in claim 3 having an outermost filter spiral channel and having an outermost layer of filter material extending radially approximately a full convolution beyond said outermost spiral channel.

5. A diesel particulate filter as defined in claim 3 wherein said open mesh material comprises knitted metal wires.

6. A diesel particulate filter as defined in claim 5 wherein said knitted metal wires are stainless steel and have a diameter in the range from about 0.2 mm to about 0.5 mm.

7. A diesel particulate filter as defined in claim 3 wherein said open mesh material has an openness of at least 80% by volume.

8. A diesel particulate filter as defined in claim 3 wherein said open mesh material is corrugated.

9. A diesel particulate filter as defined in claim 3 further comprising a screen interposed at each interface between a filter layer and a layer of open mesh material having a thickness in the range from about 4 to about 20 times the thickness of said screen.

10. A diesel particulate filter as defined in claim 9 wherein said screen has an open area of at least 20%.

11. A diesel particulate filter as defined in claim 10 wherein said screen is selected from the group consisting of perforated metal sheets, wire networks, and ceramic fabrics.

12. A diesel particulate filter as defined in claim 10 wherein said screen is an expanded metal sheet.

13. A diesel particulate filter as defined in claim 9 wherein said screen comprises knitted metal wires.

14. A diesel particulate filter as defined in claim 13 wherein said screen comprises a sleeve and said sleeve encompasses one of said layers of filter material.

15. A diesel particulate filter as defined in claim 3 wherein said stuffer chip comprises a layer of filter material comprising inorganic fibers.

16. A diesel particulate filter as defined in claim 15 wherein at least one of said filter layers or said stuffer strips includes up to about 25% by volume heat-fugitive fiber(s), based on the total fibrous mass of said at least one of said filter layers.

17. A diesel particulate filter as defined in claim 3 wherein there are two layers of said filter material and two layers of said open mesh material.

18. A diesel particulate filter as defined in claim 3 wherein said casing is cylindrical and has an inside diameter in the range from about 7 to about 20 cm, and wherein each layer of open mesh material has a thickness in the range from about 2 to about 10 mm.

19. A diesel particulate filter as defined in claim 3 wherein each of said layers of filter material comprises inorganic fibers.

20. A diesel particulate filter as defined in claim 3 wherein said stuffer strip is about equal in width to the difference between the axial dimension of said layer of open mesh material and said layer of said filter material.

* * * * *